United States Patent [19]

Lai

[11] Patent Number: 5,383,485

[45] Date of Patent: Jan. 24, 1995

[54] VALVE FOR THREE-WAY TUBINGS

[76] Inventor: Herman Lai, No. 25, Da Jin Street, Taichung, Taiwan, Prov. of China

[21] Appl. No.: 165,196

[22] Filed: Dec. 13, 1993

[51] Int. Cl.⁶ ............................................. F16K 15/18
[52] U.S. Cl. .................. 137/102; 137/527.8; 137/875
[58] Field of Search ............ 137/102, 117, 527.8, 137/112, 875

[56] References Cited

U.S. PATENT DOCUMENTS

| | | | |
|---|---|---|---|
| 2,331,602 | 10/1943 | Edwards | 137/102 X |
| 3,974,848 | 8/1976 | Wheatley | 137/102 |
| 4,362,091 | 12/1982 | Cox | 137/112 |

FOREIGN PATENT DOCUMENTS 708139  4/1954  United Kingdom .............. 137/102

Primary Examiner—Stephen M. Hepperle
Attorney, Agent, or Firm—Charles E. Baxley

[57] ABSTRACT

A three-way tubing includes an outlet, an inlet and an opening communicated with one another, a valve is pivotally supported in the tubing and includes a board and a panel perpendicular with each other, when water flows from the opening to the outlet, a force may act on the panel such that the board is forced to close the inlet and such that water is prevented from flowing through the inlet, when water flows through the inlet, the water forces the board away from the inlet when the outlet is enclosed such that the water may flow through the opening.

1 Claim, 2 Drawing Sheets

VALVE FOR THREE-WAY TUBINGS

BACKGROUND OF THE INVENTION

1. Field of the Invention

The present invention relates to a valve, and more particularly to a valve for controlling the flowing of a three-way tubing.

2. Description of the Prior Art

Typical valves comprise ball valves or solenoid valves for controlling the flowing of a tubing, such as a three-way tubing, most of the valves include a complicated configuration which is adverse for manufacturing purposes.

The present invention has arisen to mitigate and/or obviate the afore-described disadvantages of the conventional valves.

SUMMARY OF THE INVENTION

The primary objective of the present invention is to provide a valve disposed in a three-way tubing for controlling the flowing of the tubing.

In accordance with one aspect of the invention, there is provided a three-way tubing comprising an outlet, an inlet and an opening communicated with one another, the inlet being formed between the outlet and the opening and located in an upper portion of the tubing, a valve pivotally supported in the tubing and including a board and a panel perpendicular with each other, water from the opening to the outlet acting on the panel in order to force the board to close the inlet such that water is prevented from flowing through the inlet, and water from the inlet forcing the board away from the inlet when the outlet is enclosed such that water is caused to flow through the opening.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
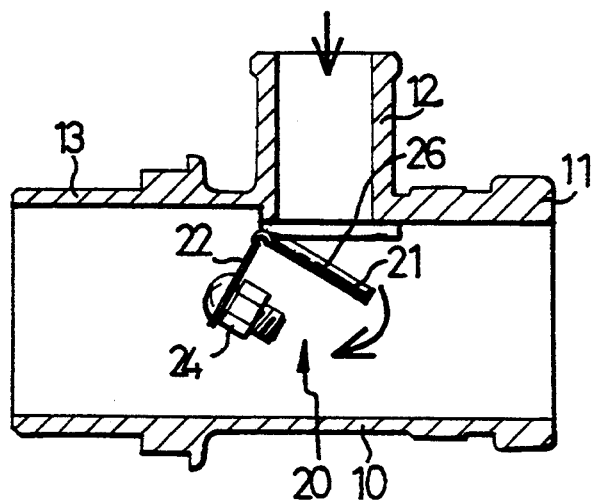
FIG. 1 is a cross sectional view of a three-way tubing having a valve in accordance with the present invention.
Figure 2:
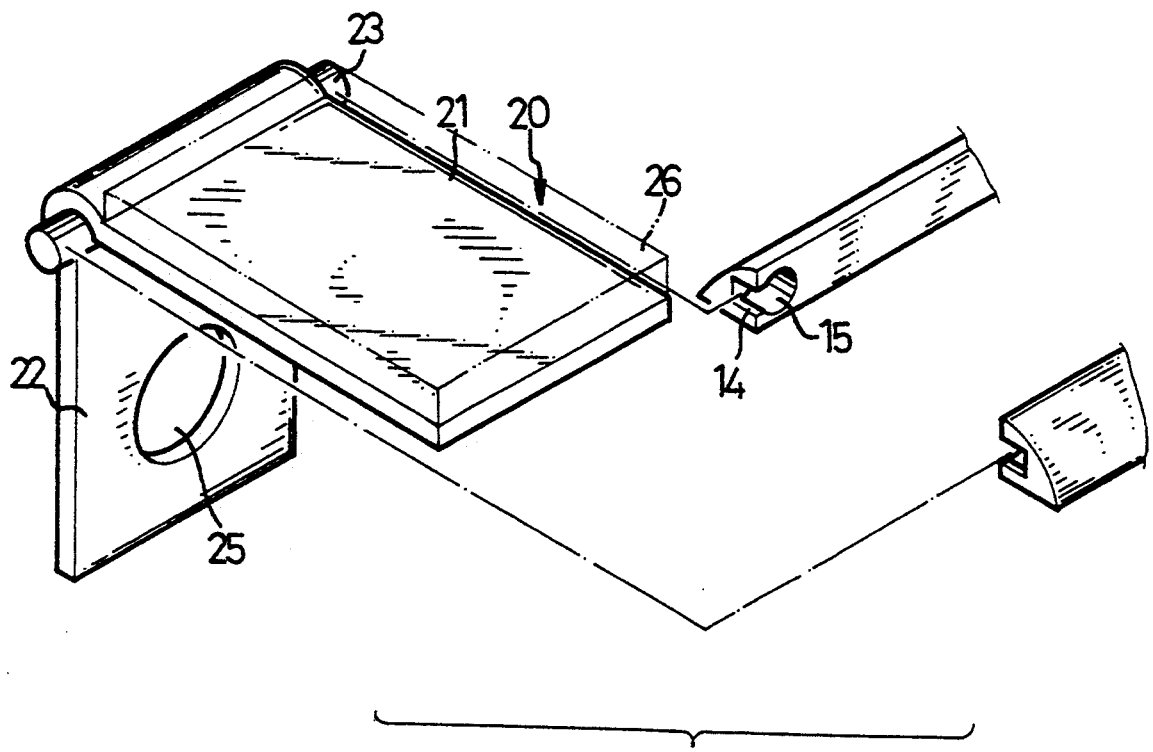
FIG. 2 is an exploded view of the valve.
Figure 3:
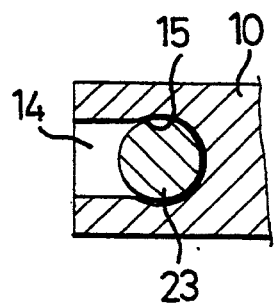
FIG. 3 is a cross sectional view illustrating the coupling of the valve to the tubing.

Referring to the drawings, and initially to FIGS. 1, 2 and 3, a valve in accordance with the present invention is disposed in a three-way tubing 10 for controlling the fluid flowing of the tubing 10, the three-way tubing 10 includes an outlet 11 connected to a faucet, an inlet 12 connected to a water heater, such is a solar heater, and an opening 13 communicated with one another, in which the inlet 12 is formed in the upper portion of the tubing 10 and is formed between the outlet 11 and the opening 13, the opening 13 is connected to a heat reservoir for receiving the water heated by the heater and flowing through the inlet 12, the tubing 10 includes a pair of slots 14 each having a cavity 15 formed therein, the valve 20 comprises a board 21 and a panel 22 formed integral with each other and perpendicular to each other, a shaft 23 rotatably secured to the coupling portion of the board 21 and the panel 22 and having two ends engaged through the slots 14 and fixed in the cavities 15 of the tubing 10 such that the valve 20 is rotatably or pivotally coupled to the tubing 10, the panel 22 including a hole 25 formed therein for engaging with a bolt and nut 24, the bolt and the nut 24 form a weight material, and the board 21 including a pad 26 for enclosing the inlet 12.

In operation, as shown in FIG. 1, when the outlet 11 is closed and when a pump disposed in the heat reservoir is actuated to cause the water flowing from the inlet 12 to the opening 13, the board 21 will be caused to disengage from the inlet 12 by the water flow, at this moment, the water may flow from the inlet 12 through the opening 13, due to the weight 24 and the force acted onto the board 21, the valve 20 will be caused to move in an oscillating way, the oscillation of the valve 20 indicates the water flow rate, it is preferable that the tubing 10 is made of transparent materials such that the oscillating movement of the valve 20 can be seen.

Figure 4:
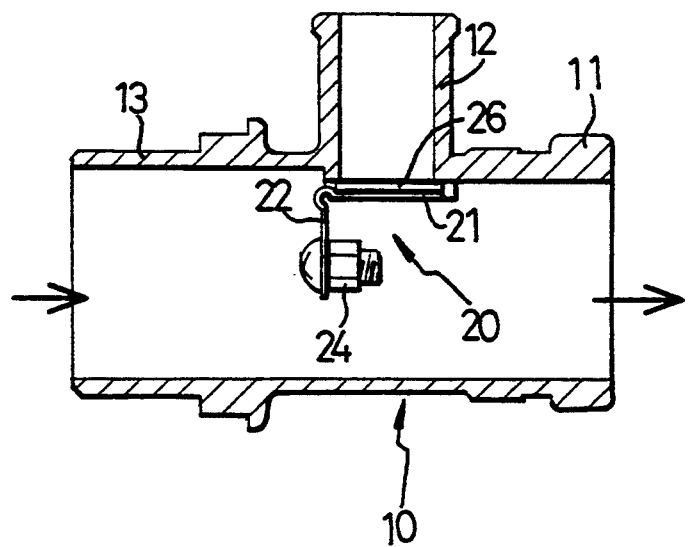
FIG. 4 is a cross sectional view similar to FIG. 1, illustrating the operation of the valve.

Referring next to FIG. 4, when the outlet 11 is opened, the water contained in the heat reservoir may flow out through the outlet 11, the water flow may apply a force against the panel 22 such that the board 21 will be caused to enclose the inlet 12, whereby, the water flowing from the opening 13 may flow out via the outlet 11 only and may not flow into the inlet 12, at this moment, the water from the inlet 12 is blocked and may not flow out through the opening 13 or the outlet.

Accordingly, the three-way tubing includes a valve in accordance with the present invention which can be used to control the water flow of the tubing and which includes a simplified configuration which is good for manufacturing and assembling purposes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A three-way tubing comprising an outlet, an inlet and an opening communicating with one another, said inlet being provided for allowing water flowing through said outlet and being formed between said outlet and said opening and located in an upper portion of said tubing, said opening being arranged for allowing water flowing through said outlet, a pair of slots formed in said tubing, said slots each including a cavity formed therein and facing toward said opening, a valve including a board and a panel solidly secured together at a shaft, said shaft including two ends engaged in said slots via said cavities so as to pivotally support said valve in said tubing, said panel being facing toward said opening and being acted said water flowing from said opening, a weight fixed to said panel, said board being forced to close said inlet when water from said opening acts on said panel, and said board being pushed away from said inlet when water flows through said inlet and when said outlet is closed such that water is caused to flow through said opening.

* * * * *